United States Patent [19]

Taylor

[11] 4,425,546
[45] Jan. 10, 1984

[54] COATING THICKNESS GAUGE

[76] Inventor: James C. Taylor, Ravenhurst, Sycamore Ave., Heywood, England

[21] Appl. No.: 240,614

[22] Filed: Mar. 5, 1981

[30] Foreign Application Priority Data

Mar. 5, 1980 [GB] United Kingdom ............... 8007500

[51] Int. Cl.³ .............................................. G01B 7/06
[52] U.S. Cl. .................................................. 324/230
[58] Field of Search ..................... 324/207, 229–231

[56] References Cited

U.S. PATENT DOCUMENTS 2,384,529  7/1940  Breitenstein ......................... 324/231
3,716,779  2/1973  Akulav ................................. 324/230
4,164,707  8/1979  Nix ....................................... 324/230
4,336,498  6/1982  Lukhvich et al. ................... 324/230

Primary Examiner—Gerard R. Strecker
Assistant Examiner—Warren S. Edmonds
Attorney, Agent, or Firm—Wenderoth, Lind & Ponack

[57] ABSTRACT

A film thickness gauge for measuring the thickness of paint, etc. has a magnet which is placed on the surface to be attracted by a magnetic substrate. The magnet is withdrawn by spring tension. A withdrawal member is braked when the magnet is released and the position of the withdrawal member on release is indicated in terms of the thickness of the coating.

7 Claims, 1 Drawing Figure

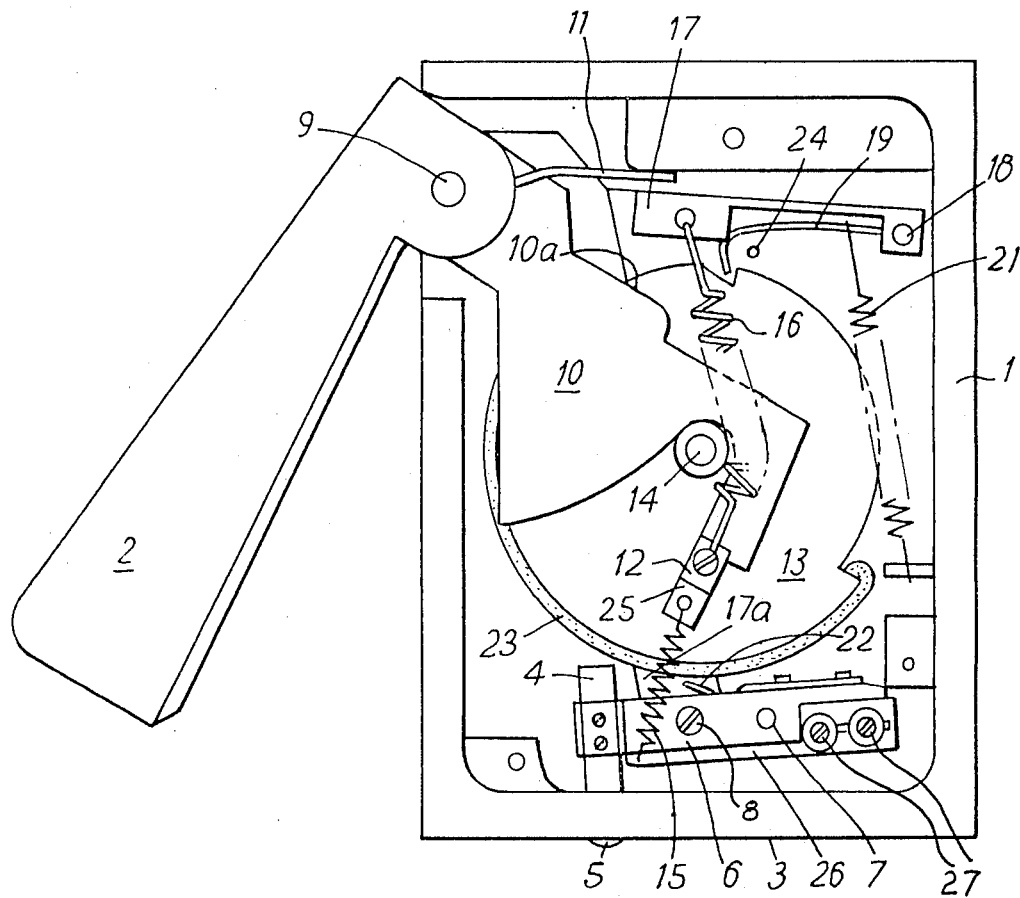

COATING THICKNESS GAUGE

The invention relates to a coating thickness gauge for measuring the thickness of a coating on a substrate of magnetic material. The coating may be of paint or varnish or the like and the invention uses the principle of obtaining an indication in accordance with the force necessary to remove a magnet from contact with the coating.

According to the invention there is provided a coating thickness gauge for measuring the thickness of a coating on a substrate of magnetic material, the gauge comprising a housing having a base which can be positioned on the coating; a magnet movably mounted in the housing and situated so as to be magnetically held on the coating by attraction by the substrate when the base is in position on the coating; a withdrawal member movably mounted in the housing; damping means coupled to the withdrawal member for damping the movement of the withdrawal member; a first spring coupling the withdrawal member to the magnet; a brake engagable with the withdrawal member and actuated by release of the magnet; an indicator coupled to the withdrawal member to indicate the position of the withdrawal member; a second spring coupled between the housing and the withdrawal member; a handle movably mounted with respect to the housing; and a release mechanism coupled to the withdrawal member, the arrangement being such that actuation of the handle releases the withdrawal member by way of the release mechanism so that the withdrawal member is drawn back by the second spring against drag of the damping means and stresses the first spring until the force of magnetic attraction is overcome, whereupon the magnet is released and actuates the brake to arrest movement of the withdrawal member, the indicator thus giving an indication in accordance with the thickness of the coating.

Preferably there is provided a retainer which retains the magnet in a rest position, the retainer being operated to free the magnet by actuation of the handle.

Preferably the handle has a return spring which returns the handle on manual release, thereby returning the withdrawal member and stressing the second spring.

Preferably the withdrawal member is pivoted in the housing and the brake comprises an arcuate surface of the withdrawal member centred on the pivot and means coupled with the magnet for engaging the surface when the magnet is released.

Preferably the magnet is mounted at the end of a pivoted lever which is counter-balanced to ensure that the attitude of the gauge during use does not affect the reading accuracy.

The invention will further be described with reference to the accompanying drawing, the sole FIGURE of which is a side elevation of a gauge in accordance with the invention.

Referring to the drawing, the gauge comprises a rectangular housing 1 having a handle 2 projecting therefrom. At the base 3 of the housing there is an aperture which accommodates a magnet 4 with a spherical end 5. The magnet is mounted on the end of an arm 6 which is pivoted at 7. Counterweights (not shown) are mounted at the other end of the arm so that the arm is precisely balanced about the pivot.

In use, the housing 1 is positioned with the base 3 on the coating and the magnet 4 is attracted by the substrate (typically steel) beneath the coating. Handle 2 is then squeezed to be rotated in a counter-clockwise direction as seen in the figure.

The handle is pivoted at 9 and has a lever arm 10 fixed thereto. A torsion spring 11 is provided for biasing the handle to the outward position shown. The end of arm 10 bears on a stud 12 which is fixed to a disc 13. Disc 13 constitutes a withdrawal member and is pivoted centrally at 14. The stud 12 is coupled by means of a helical coil-spring 15 to the arm 6 which carries the magnet. The stud is also coupled by means of a stronger spring 16 to a plate 17 which is pivoted in the housing at 18.

As the handle is squeezed its contact with stud 12 is relieved and the stud is allowed to be urged in a counter-clockwise direction and around pivot 14 by spring 16. However, rotation of the disc 13 is prevented by engagement of a spring-loaded detent 19 in a notch 20 in the disc. The operating spring for detent 19 is shown at 21. The continued movement of arm 10 eventually allows surface 10a to engage a plate 17 to raise it. Part of plate 17 bears at 17a on lever 6 and and the raising of the plate frees lever 6 to allow it to move. Ultimately, the handle will be squeezed sufficiently for arm 10 to engage the detent 19 and raise it from the notch. Then the disc 13 will be allowed to rotate. However, the speed of movement of the disc is limited by a viscous damper (not shown) behind the disc which allows the disc to move slowly and evenly.

As the disc rotates stud 12 is drawn upwardly and stresses the spring 15. This imparts a steadily increasing withdrawal force to the magnet until eventually the force overcomes the magnetic attraction and the magnet is suddenly released.

At this point a tang 22 on the upward side of lever 6 engages an arcuate friction facing 23 on the disc. The tang and facing constitute a brake for the disc so that the disc is arrested as soon as the magnet leaves the surface. The extent of the movement of the disc is representative of the force necessary to withdraw the magnet and therefore of the thickness of the coating. The disc is coupled to an indicator (not shown) attached at pivot 14 which is calibrated in terms of coating thickness.

When the handle is released the spring 11 urges the lever 10 first to release plate 17 which then pivots counter-clockwise around pivot 18 causing the part 17a to bear on a pin at 8 on lever 6 and to disengage it from the friction facing 23 on the disc. Lever 10 then continues its motion to depress stud 12 and return the gauge to the rest position shown in the drawing where the detent 19 re-engages the notch 20.

A pin 24 is provided to act as a stop for the disc to prevent excessive movement in either direction. A link 25 allows adjustment of the effective length of spring 15 with respect to the stud 12.

One end of spring 15 is coupled to the lever 6 by way of a slide 26, adjustment of the position of the slide being effected by sliding the slide 26 on lever 6, screws 27 being provided for tightening the slide on the lever. This arrangement allows adjustment for variations in the rate of the spring 15.

Stud 12 moves over an arc of a circle in such a manner that the force it imposes on balance arm 6 is non-linear function of the angle which the disc turns through, this renders the scale markings of the instrument more legibly spaced and yields an approximately logarithmic shape.

The magnet is a cylindrical rod and its tip is ground to a part-spherical shape of radius significantly greater than the radius of the rod, so that the depth of the tip is relatively small. This alters slightly the scale shape of the gauge but makes the magnet easy to grind. Also the tip is less affected by wear than it would be if it were a complete hemisphere.

The invention is not restricted to the details of the embodiment described with reference to the accompanying drawing. For example, the friction facing 23 could be replaced by a fine-toothed ratchet or otherwise serrated facing. The damping means need not be a viscous damper but could, for example, comprise a governor type mechanism.

I claim:

1. A coating thickness gauge for measuring the thickness of a coating on a substrate of magnetic material, the gauge comprising a housing having a base which can be positioned on the coating; a magnet movably mounted in the housing and situated so as to be magnetically held on the coating by attraction by the substrate when the base is in position on the coating; a withdrawal member movably mounted in the housing; damping means mounted in said housing and engaging said withdrawal member for damping the movement of the withdrawal member; a first spring coupling the withdrawal member to the magnet; a brake mounted in said housing and engageable with the withdrawal member and actuated by release of the magnet; an indicator coupled to said withdrawal member to indicate the position of the withdrawal member with respect to said housing; a second spring in the housing and coupled to the withdrawal member and stronger than said first spring and urging said withdrawal member away from said magnet for increasing the force exerted by said first spring on said magnet; a handle movably mounted with respect to the housing, and a release mechanism coupled to the withdrawal member, the arrangement being such that actuation of the handle releases the withdrawal member by way of the release mechanism so that the withdrawal member is drawn back by the second spring against drag of the damping means and stresses the first spring until the force of magnetic attraction is overcome, whereupon the magnet is released and actuates the brake to arrest movement of the withdrawal member, the indicator thus giving an indication in accordance with the thickness of the coating.

2. A coating thickness gauge as claimed in claim 1 wherein there is provided a retainer which retains the magnet in a rest position, the handle being movable to move the retainer to free the magnet.

3. A coating thickness gauge as claimed in claim 2 wherein the retainer is coupled to the release mechanism.

4. A coating thickness gauge as claimed in claim 1 wherein the handle has a return spring engaged therewith which returns the handle on manual release, thereby returning the withdrawal member and stressing the second spring.

5. A coating thickness gauge as claimed in claim 1 wherein the damping means is a viscous damper.

6. A coating thickness gauge as claimed in claim 1 wherein the first spring is a helical coil-spring, and said thickness gauge further comprises adjustment means connected to said first spring for varying the rate of the first spring.

7. A coating thickness gauge as claimed in claim 6 wherein the magnet is mounted on a pivoted arm and the adjustment means consists of means for adjusting the point of attachment of the first spring with the arm along the arm.

* * * * *